United States Patent
Allen et al.

(10) Patent No.: US 8,304,485 B2
(45) Date of Patent: Nov. 6, 2012

(54) OPACIFYING PIGMENT PARTICLE

(75) Inventors: Nathan T. Allen, Philadelphia, PA (US); Andrew G. Batzell, Philadelphia, PA (US); Ward T. Brown, North Wales, PA (US); Martin Heuts, Maria Hoop (NL)

(73) Assignee: Rohm and Haas Company, Philadelphia, PA (US)

( * ) Notice: Subject to any disclaimer, the term of this patent is extended or adjusted under 35 U.S.C. 154(b) by 310 days.

(21) Appl. No.: 12/800,592

(22) Filed: May 18, 2010

(65) Prior Publication Data

US 2010/0298484 A1 Nov. 25, 2010

Related U.S. Application Data

(60) Provisional application No. 61/216,593, filed on May 19, 2009, provisional application No. 61/340,070, filed on Mar. 12, 2010.

(51) Int. Cl.
 *C08K 3/32* (2006.01)
 *B01J 13/14* (2006.01)

(52) U.S. Cl. .................... 524/497; 427/213.34

(58) Field of Classification Search .................. 524/497, 524/431; 427/213.34
See application file for complete search history.

(56) References Cited

U.S. PATENT DOCUMENTS

| 4,421,660 | A | 12/1983 | Solc nee Hajna |
| 4,609,608 | A | 9/1986 | Solc |
| 4,680,200 | A | 7/1987 | Solc |
| 4,771,086 | A | 9/1988 | Martin |
| 5,171,772 | A | 12/1992 | Hoy et al. |
| 5,663,224 | A | 9/1997 | Emmons et al. |
| 6,080,802 | A * | 6/2000 | Emmons et al. .............. 523/205 |
| 6,756,437 | B1 | 6/2004 | Xue et al. |
| 6,833,401 | B1 | 12/2004 | Xue et al. |
| 2003/0017348 | A1 * | 1/2003 | Brown .......................... 428/447 |
| 2003/0118822 | A1 | 6/2003 | Jahns et al. |
| 2006/0009546 | A1 * | 1/2006 | Brown .......................... 523/212 |
| 2008/0171810 | A1 * | 7/2008 | Matthews et al. ............. 523/172 |
| 2010/0056668 | A1 | 3/2010 | Brown |

FOREIGN PATENT DOCUMENTS

| EP | 1832635 | 9/2007 |
| WO | WO 2007/112503 A1 | 10/2007 |

* cited by examiner

*Primary Examiner* — Michael M Bernshteyn
(74) *Attorney, Agent, or Firm* — Reid S. Willis

(57) ABSTRACT

A process for forming an opacifying pigment encapsulated in polymer including (a) dispersing a pigment particle having an average particle diameter of from 150 to 500 nm and an index of refraction of at least 1.8 such as, for example, TiO2 in a medium with from 0.1% to 10% by weight, based on the weight of said pigment particle, sulfur acid-functional first polymer whereby the zeta potential of the dispersed pigment particle is less than −28 mV between pH 5 and pH 8; and (b) performing an emulsion polymerization in the presence of the dispersed pigment particle to provide from 10% to 200%, by weight, based on the weight of the pigment particle, second polymer that at least partially encapsulates the dispersed pigment particle. Also provided are the encapsulated pigment particle so formed and compositions including the encapsulated pigment particle.

6 Claims, No Drawings

OPACIFYING PIGMENT PARTICLE

This application claims the benefit of priority under 35 U.S.C. §119(e) of U.S. Provisional Patent Application Nos. 61/216,593 filed on May 19, 2009 and 61/340,070 filed on Mar. 12, 2010.

This invention relates to a process for forming an opacifying pigment particle encapsulated in polymer. More specifically, the invention relates to a process for forming an opacifying pigment encapsulated in polymer comprising: (a) dispersing a pigment particle having an average particle diameter of from 150 to 500 nm and an index of refraction of at least 1.8 in a medium with from 0.1% to 10% by weight, based on the weight of the pigment particle, sulfur acid-functional first polymer whereby the zeta potential of the dispersed pigment particle is less than −28 mV between pH 5 and pH 8; and (b) performing an emulsion polymerization in the presence of the dispersed pigment particle to provide from 10% to 200%, by weight, based on the weight of the pigment particle, second polymer that at least partially encapsulates said dispersed pigment particle. The invention also relates to an opacifying pigment encapsulated in polymer so formed and compositions including the opacifying pigment encapsulated in polymer.

Opacifying pigments provide whiteness, and opacity or "hiding", to opacifying coatings, such as paints, and to plastics. These pigments are present in most coatings that are designed to provide an opaque coating on and to conceal and cover an undersurface or substrate surface to which the coating is applied. These pigments are also present in most plastics that are designed to be totally or partially opaque. In paints and plastics, an opacifying pigment is present whether the paint is white or colored. It is often desirable that opacifying coatings, paints, and plastics have a high opacifying efficiency so as to enable the coating or paint to completely conceal the undersurface, even if it is of a sharply contrasting color, while utilizing a minimal thickness of the coating or paint, or plastic.

Opacifying coating, paint, and plastics manufacturers have long sought to formulate opacifying coating, paints, and plastics having a desired opacity by maximizing the level of hiding while minimizing the amount of opacifying pigment utilized. Without being bound by a particular theory, it is believed that opacifying effectiveness is a function of the spacing between the particles of opacifying pigment in the coating or plastic. Maximum light scattering efficiency occurs when the opacifying pigment particles have a certain diameter and spacing, so that the light scattering capability of each particle does not interfere with the light scattering capability of its neighboring particles. This condition may occur in coatings and plastics containing sufficiently low levels of opacifying pigment such that the individual opacifying pigment particles are isolated from each other. Coatings and plastics containing such low levels of opacifying pigment, however, often do not provide sufficient opacity or hiding at a desirable thicknesses. Achieving the desired levels of hiding or opacity typically requires higher levels of opacifying pigment. At these higher levels, a statistical distribution of opacifying pigment particles occurs, which results in at least some of the opacifying pigment particles being in such close proximity to one another that there is a loss of light scattering efficiency due to crowding of the opacifying pigment particles. Increased hiding efficiency is obtained by reducing the crowding of the opacifying pigment particles and minimizing the formation of clusters of opacifying pigment particles. One method to achieve this is to encapsulate the opacifying pigment particles within a polymer matrix by polymerizing polymer on the surface of the opacifying pigment particles.

U.S. Pat. No. 4,421,660 discloses inorganic solids encapsulated in a polymer matrix, wherein the inorganic solids are encapsulated in a hydrophobic addition polymer by a polymerization process wherein a water-immiscible monomer is dispersed in an aqueous colloidal dispersion of the inorganic particles polymer by an emulsion polymerization process. Prior to the emulsion polymerization process, the pigment particles are dispersed in water using dispersants or surfactants. Although this process is described as providing pigment particles encapsulated in a polymeric material, the disclosed process employing the disclosed dispersants and surfactants produces large amounts of grit and is not viable.

We have discovered that certain sulfur acid-functional polymers, when used as dispersants for certain inorganic pigment particles, provide for the encapsulation of the pigment particles via a viable emulsion polymerization process. The opacifying pigment encapsulated in polymer provides desirably high hiding efficiency and is capable of being formed in an aqueous medium with low grit levels.

According to a first aspect of the present invention there is provided a process for forming an opacifying pigment encapsulated in polymer comprising: (a) dispersing a pigment particle having an average particle diameter of from 150 to 500 nm and an index of refraction of at least 1.8 in a medium with from 0.1% to 10% by weight, based on the weight of said pigment particle, sulfur acid-functional first polymer whereby the zeta potential of said dispersed pigment particle is less than −28 mV between pH 5 and pH 8; and (b) performing an emulsion polymerization in the presence of said dispersed pigment particle to provide from 10% to 200%, by weight, based on the weight of said pigment particle, second polymer that at least partially encapsulates said dispersed pigment particle.

According to a second aspect of the present invention there is provided an opacifying pigment encapsulated in polymer formed by the process comprising: (a) dispersing a pigment particle having an average particle diameter of from 150 to 500 nm and an index of refraction of at least 1.8 in a medium with from 0.1% to 10% by weight, based on the weight of said pigment particle, sulfur acid-functional first polymer whereby the zeta potential of said dispersed pigment particle is less than −28 mV between pH 5 and pH 8; and (b) performing an emulsion polymerization in the presence of said dispersed pigment particle to provide from 10% to 200%, by weight, based on the weight of said pigment particle, second polymer that at least partially encapsulates said dispersed pigment particle.

According to a third aspect of the present invention there is provided a composition comprising said opacifying pigment encapsulated in polymer formed by the process of the second aspect of the present invention.

The present invention relates to a process for forming an opacifying pigment encapsulated in polymer. The opacifying pigment particle has an average particle diameter of from 150 to 500 nm and an index of refraction of at least 1.8. By "opacifying" herein is meant that the particle engenders opacity when subject to light of a certain wavelength, not necessarily visible light. For example certain nano-particles included herein provide opacity when subject to light of wavelengths lower than the visible range. The shape of the pigment particles is not important. Suitable shapes for the pigment particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. The pigment particles having spherical shapes have average diameters in the range of from 150 nm to 500 nm, preferably in the range of from 200 nm to 350 nm. Pigment particles having nonspherical shapes preferably have average diameters, defined as their maximum dimension, of from 150 nm to 500 nm, preferably of from 200 nm to 350 nm. The average diameters of pigment particles are typically provided by pigment particle suppliers.

The pigment particles are also characterized as having an index of refraction [$n_D$ (20° C.)] that is at least 1.8, preferably at least 1.9, and more preferably at least 2.0. The indices of refraction for various materials are listed in CRC Handbook of Chemistry and Physics, 80th Edition, D. R. Lide, editor, CRC Press, Boca Raton, Fla., 1999, pages 4-139 to 4-146.

Suitable opacifying pigment particles include zinc oxide, antimony oxide, zirconium oxide, chromium oxide, iron oxide, lead oxide, zinc sulfide, lithopone, and forms of titanium dioxide such as anatase and rutile. Preferably, the pigment particles are selected from titanium dioxide and lead oxide. More preferably, the pigment particles are selected from rutile titanium dioxide and anatase titanium dioxide. Most preferably, the pigment particles are rutile titanium dioxide. A coating containing two different forms of a material, such as rutile and anatase titanium dioxide, is considered to have two different pigments.

The pigment particles may have a uniform composition or a heterogeneous composition with two or more phases. Certain heterogeneous pigment particles have an inner core and surrounding shell structure wherein one type of pigment particle forms the core and another type of particle forms the shell. The core and shell heterogeneous pigment particles include core/shell particles having a shell completely or incompletely encapsulating the core; core/shell particles having more than one core; dipolar particles; and particles having multiple domains of one phase on the surface of the other phase. Pigment particles, such as titanium dioxide, can have at least one coating of one or more of silica, alumina, zinc oxide, and zirconia. For example, in certain embodiments titanium dioxide particles suitable for use in coatings of the present invention may have a coating of silica and a coating of alumina.

In the first aspect of the invention the opacifying pigment encapsulated in polymer is dispersed with from 0.1% to 10%, more preferably from 0.5% to 5%, and most preferably from 0.5% to 2% by weight, based on the weight of the pigment particle, sulfur acid-functional first polymer. The pigment particles are dispersed in a medium, preferably an aqueous medium, with the sulfur acid-functional first polymer. By "aqueous medium" herein is meant water and from 0 to 30%, by wt. based on the weight of the aqueous medium, of water-miscible compound(s). "Sulfur acid-functional polymer" herein includes any polymer that includes on average at least three moles of sulfur acid moieties per mole of polymer chains. As used herein, the term "sulfur acid-functional monomer" is meant to include any monomer containing at least one free radical polymerizable vinyl group, and at least one sulfur acid moiety. As used herein, the term "sulfur acid moiety" is meant to include any of the following residues: —S(O)2(OH), —OS(O)2(OH), —OS(O)(OH), —S(O)(OH). Also included in the definition of term "sulfur acid moiety" are salts of the above residues.

The sulfur acid-functional first polymer can be any of a polymer with at least three sulfur acid moieties located randomly in the polymer backbone, a block copolymer with a single sulfur acid-including block and at least one block which does not have sulfur acids, or a comb-graft polymer with a backbone that includes sulfur acids and teeth which do not include sulfur acids. The block copolymers can have the sulfur acid-including block located terminal to the polymer, or within the interior of the polymer chain. It is preferred that the polymer includes at least five sulfur acid groups in the backbone. It is most preferred that the polymer backbone includes at least eight sulfur acid groups. The sulfur acid-functional polymer may be made as a solution polymer in water or a non-aqueous solvent, or as a bulk polymer. The sulfur acid-functional polymer may be made by any suitable polymerization process, such as addition polymerization of ethylenically unsaturated monomers such as acrylic, styrenic, or vinyl monomers. Polymers that contain sulfur acid groups may be made by the addition polymerization of ethylenically unsaturated monomers, including in the monomer mix functional monomers that can be converted to sulfur acid groups after the polymerization is completed. Examples of monomers that can be converted to sulfur acids after the polymerization is completed include isocyanate-functional monomers which can be reacted with aminosulfates. Block copolymers that include a sulfur acid-functional polymer-including block may be made by any known process that is capable of producing such polymers. For example, block copolymers that include a sulfur acid-functional polymer-including block may be made by the living free radical polymerization of ethylenically unsaturated monomers wherein the monomer composition of one of the monomer feeds includes at least one sulfur acid-functional unsaturated monomer. As a further example, block copolymers that include a sulfur acid-functional polymer-including block may be made by the living free radical polymerization of ethylenically unsaturated monomers, including in the monomer mix functional monomers that can be converted to amine or sulfur acid groups after the polymerization is completed. Comb-graph polymers that include a sulfur acid-functional polymer-including backbone may be made by any known process that is capable of producing such polymers. For example, comb-graft polymers that include a sulfur acid-functional polymer-including backbone may be made by the free radical polymerization of ethylenically unsaturated monomers wherein the monomer composition includes at least unsaturated macromer and at least one sulfur acid-functional unsaturated monomer. As a further example, comb-graft polymers that include a sulfur acid-functional polymer-including backbone may be made by the living free radical polymerization of ethylenically unsaturated monomers, including in the monomer mix functional monomers that can be converted to amine or sulfur acid groups after the polymerization is completed. It is preferred that the sulfur acid-functional polymer be a linear random copolymer.

The sulfur acid-functional first polymer is typically prepared by the addition polymerization of ethylenically unsaturated monomers. Suitable monomers include styrene, butadiene, alpha-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various C1-C40 alkyl esters of (meth)acrylic acid; for example, methyl(meth)acrylate, ethyl(meth)acrylate, n-butyl(meth)acrylate, 2-ethylhexyl(meth)acrylate, cyclohexyl(meth)acrylate, n-octyl (meth)acrylate, n-decyl(meth)acrylate, n-dodecyl(meth) acrylate, tetradecyl(meth)acrylate, lauryl(meth)acrylate, oleyl(meth)acrylate, palmityl(meth)acrylate, and stearyl (meth)acrylate; other (meth)acrylates such as isobornyl (meth)acrylate, benzyl(meth)acrylate, phenyl(meth)acrylate, 2-bromoethyl(meth)acrylate, 2-phenylethyl(meth)acrylate, and 1-naphthyl(meth)acrylate, alkoxyalkyl(meth)acrylate, such as ethoxyethyl(meth)acrylate, mono-, di-, trialkyl esters of ethylenically unsaturated di- and tricarboxylic acids and anhydrides, such as ethyl maleate, dimethyl fumarate, trimethyl aconitate, and ethyl methyl itaconate; alcohol containing monomers such as hydroxyethyl(meth)acrylate, hydroxypropyl(meth)acrylate, hydroxybutyl(meth)acrylate; carboxylic acid containing monomers, such as (meth)acrylic acid, itaconic acid, fumaric acid, and maleic acid. Examples of suitable sulfur acid-functional monomers include sulfoethyl(meth)acrylate, sulfopropyl(meth)acrylate, styrene sulfonic acid, vinyl sulfonic acid, and 2-(meth)acrylamido-2-methyl propanesulfonic acid, and salts there of. Examples of suitable amine-functional monomers include dimethylamino ethyl(meth)acrylate, dimethylamino propyl(meth)acrylamide, and t-butylamino ethyl(meth)acrylate. As used herein, the term "(meth)acrylate" refers to either acrylate or methacrylate and the term "(meth)acrylic" refers to either acrylic or methacrylic.

The sulfur acid-functional first polymer random copolymer, sulfur acid including block of the block copolymer, or sulfur acid including backbone of the comb-graft polymer may have a weight average molecular weight of 1000 to 200,000, preferably from 1000 to 50,000, more preferably from 2000 to 15,000, and most preferably from 3000 to 10,000. When the sulfur acid-functional polymer is a block copolymer or a comb-graft polymer, the non-sulfur acid including block(s) or teeth, respectively, may have a weight average molecular weight of 750 to 200,000, more preferably from 1000 to 50,000, more preferably form 1500 to 25,000, and most preferably from 5000 to 15,000. The molecular weights may be determined by GPC.

The dispersion step may be effected by any means commonly used to disperse pigments in a medium, including, for example, grinding with a high speed dispersator, or grinding in media mills or ball mills.

The sulfur acid-functional first polymer may be used as a conventional pigment dispersant or be disposed on the surface of the opacifying pigment particle prior to contacting the opacifying pigment particle with the dispersion medium. Different methods can be employed to put the sulfur acid functional-polymer on the surface of the opacifying pigment particle. For example, the opacifying pigment particles can first be dispersed in a predominantly non-aqueous medium utilizing the sulfur acid-functional first polymer and then the non-aqueous medium is removed by distillation and replaced by the addition of water. Another method to put the sulfur acid functional first polymer on the surface of the opacifying pigment particle is to first disperse the opacifying pigment particle in a predominantly non-aqueous medium utilizing the sulfur acid functional first polymer and then the medium is removed by evaporation. The dried opacifying pigment particles containing the first sulfur acid functional polymer are then dispersed into water. Yet another method to put the sulfur acid-functional first polymer on the surface of the opacifying pigment particles is to create a fluidized bed of the opacifying pigment particles and then inject a solution of the sulfur acid-functional first polymer into the fluidized bed. The temperature of the fluidized bed should be high enough to evaporate the solvent in which the sulfur acid functional first polymer is dissolved. The dried opacifying pigment particles including the first sulfur acid functional polymer are then dispersed into water. The fluidized bed of the last example could conceivably be replaced by any part of the production process of these opacifying pigment particles in which the opacifying pigment particles are being dried.

The dispersed pigment particle has a zeta potential of <−28 mV between pH5 and pH8. The zeta potential of the dispersion is a measure of the stability of particulate dispersions. The more negative the zeta potential the more stable the dispersion (for anionic dispersants). By "zeta potential" herein is meant the zeta potential of the pigment dispersion in the medium at a dispersant level of 1.5% by weight based on pigment weight as measured over a pH range of from 5 to 8, preferably from 5 to 7, and more preferably from 5 to 6. The zeta potential of the opacifying pigment dispersion during the encapsulation stage must be <−28 mV, preferably <−35 mV, and more preferably <−38 mV. In the process of this invention the selection of the pigment, sulfur acid-functional first polymer, and optional pigment dispersant are made so as to achieve the desired zeta potential.

In any event the opacifying pigment dispersion must have sufficient stability during storage (substantially maintaining the same particle size, no or minimal sediment formation) and must have sufficient stability to withstand flocculation during the second polymer encapsulation process. During the initial stages of the encapsulation process the stabilization mechanism will typically change from a dispersant-stabilized particle surface at a first pH to a surfactant-stabilized polymer surface at a lower pH. It is believed that while this change is taking place there will inevitably be an interval in which the stabilization by the dispersant is reduced and if the stabilization gets too weak then flocculation of opacifying pigment particles may occur.

A subsequent step in the process of the present invention consists of at least partially encapsulating the dispersed pigment particles with from 10% to 200%, by weight, based on the weight of the pigment particle, second polymer by performing an emulsion polymerization in the presence of the dispersed pigment particles.

The opacifying pigment encapsulated in polymer of the present invention includes from 10% to 200%, by weight, based on the weight of the pigment particle, second polymer that at least partially encapsulates the pigment particle. The second polymer is typically prepared by free radical emulsion polymerization of ethylenically unsaturated monomers in the presence of the pigment particle that has been dispersed in a medium. In some embodiments the second polymer is made of a monomer mixture containing at least one water-soluble monomer. By "water-soluble monomer" herein is meant that less than 95 parts of water, by weight, completely dissolves 5 parts of the monomer, by weight, at 25° C. Examples of suitable water soluble monomers are acid functional monomers like 2-sulfoethyl(meth)acrylate, sulfopropyl(meth) acrylate, styrene sulfonic acid, vinyl sulfonic acid, 2-(meth) acrylamido-2-methyl propanesulfonic acid, acrylic acid, methacrylic acid, itaconic acid and the salts thereof. Other suitable water soluble monomers are acrylamide, diacetone-acrylamide, 2-hydroxyethyl methacrylate and 2-hydroxyethyl acrylate.

By "at least partially encapsulated" herein is meant that the second polymer is in contact with at least a part of the surface of the pigment particle. The degree of encapsulation of the pigment particle may be determined using an electron micrograph. Determination of the degree of encapsulation does not include any contribution of first polymer, surfactant, dispersant, or the like. By "X % encapsulated" herein is meant that X % of the surface area of the pigment particle is in contact with the second polymer; preferably greater than 50%, more preferably greater than 75%, and most preferably 100% of the surface area of the particle is in contact with the second polymer. The thickness of the second polymer encapsulant layer or shell may be up to 500 nm; for TiO2 pigment, for example, preferred thickness of the second polymer encapsulant layer or shell is typically between 20 nm and 150 nm, preferably from 40 nm to 100 nm.

The emulsion polymerization can be carried out by methods well known in the polymer art, and includes multiple stage polymerization processes. Various synthesis adjuvants such as initiators, chain transfer agents, and surfactants are optionally utilized in the polymerization. In general, the emulsion polymerization is of a seeded type emulsion polymerization, with the dispersed pigment particles acting as the seeds. In one embodiment of the present invention, the reaction vessel is charged with water, dispersed pigment, and optionally surfactants and other polymerization adjuvants, and then the monomers for the second polymer are added to the kettle. In another embodiment of the present invention, the reaction vessel is charged with water, dispersed pigment, and optionally surfactants and other polymerization adjuvants, and then a part of the monomers for the polymer matrix is added to the kettle, and then a seed consisting of emulsified polymer particles, made separately, is added, and finally the remainder of the monomer for the polymer matrix is added to the kettle. In yet another embodiment of the present invention, the reaction vessel is charged with water, and optionally surfactants and other polymerization adjuvants and optionally a polymer seed, then a part of the monomers for the polymer matrix is added to the kettle, then the dispersed pigment is added to the kettle, and finally the remainder of the monomer for the polymer matrix is added to the kettle. The polymerization may be run as a shot process, or by using multiple shots, or by continuously feeding in the monomer over time. The monomer may be added neat or emulsified in water with appropriate surfactants. For the process to be considered acceptable herein it must be capable of being effected at a final solids level of 50 wt % or higher, preferably at 55 wt % or higher, with less than 0.5% by weight, based on the weight of total solids, of grit formation.

In a preferred embodiment of the present invention, the second polymer includes at least one sulfur acid-functional monomer. Examples of suitable sulfur acid-functional monomers include sulfoethyl(meth)acrylate, sulfopropyl(meth)acrylate, styrene sulfonic acid, vinyl sulfonic acid, and 2-(meth)acrylamido-2-methyl propanesulfonic acid, and salts thereof. Preferably the sulfur acid-functional monomer is styrene sulfonic acid or its salt. The sulfur acid-functional monomer may be present at a level of from 0.1% to 20% by weight of the monomers used to make the second polymer containing the sulfur acid-functional monomer, preferably from 0.25% to 10%, more preferably from 0.25% to 5%, most preferably from 0.5% to 2%. If the second polymer contains more than one polymer phase, then the sulfur acid-functional monomer may be present in just some or in all of the polymer phases. If the second polymer contains more than one polymer phase, it is preferable that the sulfur acid-functional monomer is present in the first polymer stage to be polymerized.

Polymerization of the monomers for the second polymer is effected by addition of a polymerization initiator. The polymerization initiator may be added to the kettle prior to the monomer addition, or concurrent with the monomer addition, after the monomer addition, or as a combination of these. Examples of suitable polymerization initiators include polymerization initiators that thermally decompose at the polymerization temperature to generate free radicals. Examples include both water-soluble and water-insoluble species. Examples of suitable free radical-generating initiators include persulfates, such as ammonium and alkali metal (potassium, sodium, and lithium) persulfate; azo compounds, such as 2,2'-azobis(isobutyronitrile), 2,2'-azobis(2,4-dimethylvaleronitrile), and t-butyl azocyanocyclohexane; hydroperoxides, such as t-butyl hydroperoxide and cumene hydroperoxide; peroxides, such as benzoyl peroxide, caprylyl peroxide, di-t-butyl peroxide, ethyl 3,3'-di-(t-butylperoxy)butyrate, ethyl 3,3'-di(t-amulperoxy)butyrate, t-amylperoxy-2-ethyl hexanoate, and t-butylperoxy pivilate; peresters, such as t-butyl peracetate, t-butyl perphthalate, and t-butyl perbenzoate; as well as percarbonates, such as di(1-cyano-1-methylethyl)peroxy dicarbonate; and perphosphates.

Polymerization initiators may be used alone, and alternatively, as the oxidizing component of a redox system, which also includes a reducing component, such as an acid selected from the group consisting of: ascorbic acid, malic acid, glycolic acid, oxalic acid, lactic acid, and thioglycolic acid; an alkali metal sulfite, typically a hydrosulfite, such as sodium hydrosulfite; a hyposulfite, such as potassium hyposulfite; or a metabisulfite, such as potassium metabisulfite; and sodium formaldehyde sulfoxylate.

Suitable levels of initiator and the optional reducing component include proportions of from 0.001% to 5% each, based on the weight of the monomers in the monomer mixture to be polymerized. Accelerators such as chloride and sulfate salts of cobalt, iron, nickel, and copper are generally used in small amounts. Examples of redox catalyst systems include t-butyl hydroperoxide/sodium formaldehyde sulfoxylate/Fe(II), and ammonium persulfate/sodium bisulfite/sodium hydrosulfite/Fe(II).

Chain transfer agents are optionally added to the aqueous reaction medium to control molecular weight of the second polymer. Examples of chain transfer agents include mercaptans, polymercaptans, and polyhalogen compounds. Examples of suitable chain transfer agents include alkyl mercaptans, such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; 3-mercaptoproprionic acid; 2-hydroxyethyl mercaptan; alcohols, such as isopropanol, isobutanol, lauryl alcohol, and t-octyl alcohol; and halogenated compounds, such as carbon tetrachloride, tetrachloroethylene, and trichlorobromoethane. Generally from 0 to 10% chain transfer agent, by weight based on the weight of the monomer, is used to prepare the second polymer. Other techniques for controlling molecular weight, known in the art, include selecting the ratio of the initiator to total monomer amount.

Catalyst and/or chain transfer agent are optionally dissolved or dispersed in separate or the same fluid medium, and gradually added to the polymerization vessel. Monomer, neat, dissolved, or dispersed in a fluid medium, is optionally added simultaneously with the catalyst and/or the chain transfer agent.

The emulsion polymerization reaction medium typically contains surfactant to stabilize the growing second polymer-encapsulated particles during polymerization and to discourage aggregation of the polymer-encapsulated pigment particles in the resulting aqueous dispersion. One or more surfactants, including anionic and nonionic surfactants, and mixtures thereof, are commonly used. Many examples of surfactants suitable for emulsion polymerization are given in *McCutcheon's Detergents and Emulsifiers* (MC Publishing Co. Glen Rock, NF), published annually. Other types of stabilizing agents, such as protective colloids, are optionally used. However, it is preferred that the amount and type of stabilizing surfactant or other type of stabilizing agent employed during the polymerization reaction be selected so that residual stabilizing agent in the resulting aqueous dispersion does not significantly interfere with the properties of the aqueous dispersion, the properties of compositions including the aqueous dispersion, or articles prepared from the aqueous dispersion.

Suitable anionic surfactants include, for example, alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium octyl phenoxypolyethoxyethyl sulfate, having 1 to 5 oxyethylene units.

Suitable nonionic surfactants include, for example, alkyl phenoxypolyethoxy ethanols having alkyl groups of from 7 to 18 carbon atoms and from 6 to 60 oxyethylene units, such as, for example, heptyl phenoxypolyethoxyethanols; ethylene oxide derivatives of long chained carboxylic acids, such as lauric acid, myristic acid, palmitic acid, oleic acid, or mixtures of acids, such as those found in tall oil, containing from 6 to 60 oxyethylene units; ethylene oxide condensates of long chained alcohols such as octyl, decyl, lauryl, or cetyl alcohols, containing from 6 to 60 oxyethylene units; and block copolymers of ethylene oxide sections combined with one or more hydrophobic propylene oxide sections. High molecular weight polymers, such as hydroxyethyl cellulose, methyl cellulose, and polyvinyl alcohol, are also usable.

In a preferred embodiment of the present invention the dispersed pigment particles are further stabilized with certain surfactants prior to the introduction of any monomers used to make the second polymer. These surfactants include the family of sulfosuccinic acid esters of the formula R—OC(O)CH2CH(SO3H)C(O)OR', where R and R' may be alkyl, aryl, allyl, vinyl, styrenyl, or (meth)acryl, or H, and where R and R' may be the same or different, with the exception that R and R' may not both be H. Preferably, R is C6 to C16 alkyl and R' is allyl. It has been discovered that use of such surfactants in the manner specified allows the emulsion polymerization to be run with much lower gel levels than result when no surfactant is used, or when other surfactants are used.

After the emulsion polymerization is complete, the polymer encapsulated pigment particles may be provided as an aqueous dispersion, or alternately they may be provided as a solid in the form of a powder or pellet. The polymer encapsulated pigment particles may be removed from the aqueous medium of the emulsion polymerization by any appropriate technique including, for example, evaporative drying, spray drying, filtration, centrifugation, or coagulation. When the polymer-encapsulated pigment particles are provided as a solid, it is preferred that the Tg of the second polymer, or the Tg of the outermost phase of the second polymer in the case where the second polymer contains multiple phases, is above the temperature at which the polymer-encapsulated pigment particles will be stored, transported, and optionally processed prior to final application.

The composition of the present invention including the opacifying pigment encapsulated in second polymer of the invention is typically a coating or a plastic. Optionally, the coating or plastic also includes one or more of extender particles, secondary pigment particles, and third polymers.

The binder of the coating or plastic of the present invention is the continuous medium containing the polymer-encapsulated pigment particles. The binder may consist solely of the second polymer which encapsulates the pigment particles, or it may be a mixture of the encapsulating second polymer and one or more third polymers. Both the second polymer and third polymer are independently, alternatively a homopolymer, a copolymer, an interpenetrating network polymer, and a blend of two or more polymers or copolymers. Suitable third polymers include acrylic (co)polymers, vinyl acetate polymers, vinyl/acrylic copolymers, styrene/acrylic copolymers, polyurethanes, polyureas, polyepoxides, polyvinyl chlorides, ethylene/vinyl acetate polymers, styrene/butadiene polymers, polyester polymers, polyethers, and the like, and mixtures thereof.

In one embodiment the binder may be a mixture of a polymer and a pre-polymeric material. The polymer-encapsulated pigment particles are alternatively provided in a liquid medium such as an organic solvent or water, or a mixture of organic solvents and water, or are provided as a solid, such as a powder. The optional third polymer is alternatively provided in a liquid medium such as a solution polymer, an emulsion polymer, or a suspension polymer, or is provided as a solid, such as a polymer powder or an extrusion polymer. Either or both the second polymer of the polymer-encapsulated pigment or the optional third polymer may contain reactive groups, which upon formation of a coating film or finished plastic part or afterwards, crosslink either with themselves or with externally added crosslinkers to provide a crosslinked binder. Examples of pre-polymeric materials are ethylenically unsaturated monomers and oligomers, and two-part crosslinking systems such as compositions containing isocyanate groups and alcohol groups. Conventional crosslinking agents such as, for example, polyaziridine, polyisocyanate, polycarbodiimide, polyepoxide, polyaminoplast, polyalkoxysilane, polyoxazoline, polyamine, and a polyvalent metal compound can be used as externally added crosslinkers. Typically, from 0 to 25 wt % of the crosslinking agent is used, based on the dry weight of the polymer.

The polymers which form the binder typically have glass transition temperatures in the range of from −60° C. to 150° C., as calculated by the Fox equation [*Bulletin of the American Physical Society* 1, 3 Page 123 (1956)]. The coating or plastic composition optionally contains coalescents or plasticizers to provide the polymers with effective film formation temperatures at or below the temperature at which the coating is applied or cured, or the plastic part is formed. The level of optional coalescent is typically in the range of from 0 to 40 wt %, based on the weight of the polymer solids.

In a preferred embodiment of the present invention, the second polymer contains at least two phases, where-in one second polymer phase has a Tg greater than or equal to 305° C., preferably greater than or equal to 45° C., and at least one other second polymer phase has a Tg less than or equal to 12° C., preferably less than or equal to 0° C., most preferably less than or equal to −5° C. In this embodiment of the present invention, the one second polymer phase may be between 5% and 50%, preferably between 10% and 40%, and most preferably between 15% and 30%, by weight based on the pigment particle weight. The total of the rest of the polymer phases of the second polymer can be between 5% and 150%, preferably between 10% and 125%, most preferably between 20% and 100%, by weight based on the pigment particle weight.

In a preferred embodiment of the present invention, the second polymer contains at least two phases, wherein the first second polymer phase to be polymerized contains a multifunctional monomer. Suitable multifunctional monomers include, for example, allyl(meth)acrylate, divinyl benzene, ethylene glycol di(meth)acrylate, propylene glycol di(meth)acrylate, trimethylolpropane tri(meth)acrylate, glycerol tri(meth)acrylate, and polyethylene glycol di(meth)acrylate. The multifunctional monomer may be present at a level of from 0.01% to 50%, preferably from 0.1% to 10%, more preferably from 0.2% to 5%, and most preferably from 0.2% to 2%, by weight based on the total weight of the monomers which make up the first phase of the second polymer. In this embodiment of the present invention, it is preferred that all of the phases of the second polymer have a Tg less than or equal to 5° C., preferably less than or equal to −5° C. In this embodiment of the present invention, the first phase of second polymer may be between 5% and 50%, preferably between 10% and 40%, and most preferably between 15% and 30%, by weight based on the pigment particle weight. The total of the rest of the polymer phases of the second polymer can be between 5% and 150%, preferably between 10% and 125%, and most preferably between 20% and 100%, by weight based on the pigment particle weight.

The coating or plastic of this invention optionally contains extender particles. The extender particles do not significantly scatter light. Extender particles have an index of refraction of less than 1.8 and typically greater than or equal to 1.3. Suitable extender particles include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc. Other examples of extenders include solid bead extenders, also known in the art as solid bead pigments, such as polystyrene and polyvinyl chloride beads.

The coating or plastic of this invention optionally contains secondary pigment particles. The secondary pigment particles have an index of refraction less than the index of refraction of the polymer matrix. Secondary pigment particles include pigment particles containing air voids, such as polymer particles containing air voids. The air void is characterized as having an index of refraction close to or equal to 1. Secondary pigment particles including microsphere pigments such as polymer particles containing one or more voids and vesiculated polymer particles are disclosed in U.S. Pat. Nos. 4,427,835; 4,920,160; 4,594,363; 4,469,825; 4,468,498; 4,880,842; 4,985,064; 5,157,084; 5,041,464; 5,036,109; 5,409,776; and 5,510,422.

The coating or plastic of this invention contains from 1 to 50 volume % pigment particles in the form of polymer-encapsulated pigment particles, preferably from 3 to 30 volume %, and more preferably from 5 to 20 volume %, based on the total volume of the coating or plastic. The coating or plastic contains from 10 to 99 volume % second and third polymer, preferably from 20 to 97 volume %, and more preferably from 25 to 80 volume %, based on the total volume of the coating or plastic. The coating or plastic contains from 0 to 70 volume % extender particles, preferably from 0 to 65 volume %, and more preferably from 0 to 60 volume %, based on the total volume of the coating or plastic. The coating or plastic contains from 0 to 20 volume % secondary pigment particles, preferably from 0 to 17 volume %, and more preferably from 0 to 15 volume %, based on the total volume of the coating or plastic.

The coating composition of the present invention optionally may also include other materials commonly found in coatings such as extenders, other polymers, hollow sphere pigments, solvents, coalescents, wetting agents, defoamers, rheology modifiers, crosslinkers, dyes, pearlescents, adhesion promoters, dispersants, leveling agents, optical brighteners, ultraviolet stabilizers, preservatives, biocides, and antioxidants.

Examples of "coatings" herein include inks, paper coatings; architectural coatings, such as interior and exterior house paints, wood coatings and metal coatings; coatings for leather; coatings and saturants for textiles and nonwovens; adhesives; powder coatings; and traffic paints such as those paints used to mark roads, pavements, and runways. Liquid coatings may be water or solvent based. When the coating is a powder coating, it is preferred that the Tg of the polymeric matrix, or the Tg of the outer most phase of the polymeric matrix in the case where the polymeric matrix contains multiple phases, is above the temperature at which the coating will be stored, transported, and optionally processed prior to final application. When the coating is a solvent-based coating, it is preferred that the second polymer of the polymer-encapsulated pigment particles is not substantially soluble in the solvent or mixture of solvents utilized in the coating.

The plastic of the present invention optionally may also include other materials commonly found in plastics such as pigment particles which do not fall under the present invention, extenders, other polymers, hollow sphere pigments, plasticizers, flow agents, and crosslinkers. "Plastics" herein includes solid or flexible materials in the form of objects, films, etc.

The examples which follow illustrate aspects of the present invention. The abbreviation "g" represents "grams". The abbreviation "mm" represents "millimeters". The abbreviation "cm" represents "centimeters". The abbreviation "mil" represents "1/1000ths of an inch".

Abbreviations:
AA=Glacial acrylic acid
AIBN=azoisobutyronitrile
AMPS™=2-acrylamido-2-methyl-1-propanesulfonic acid
BA=Butyl acrylate
BMA=Butyl methacrylate
DI water=Deionized water
EDTA=Ethylene diamine tetra acetic acid sodium salt (VERSENE™)
HEMA=2-Hydroxyethyl methacrylate
IAA=Isoascorbic acid
MAA=Glacial methacrylic acid
MMA=Methyl methacrylate
MSi=3-mercaptopropyl trimethoxysilane
nDDM=n-dodecylmercaptan
SEM=Sulfoethyl methacrylate
SSF=Sodium sulfoxylate formaldehyde
STY=Styrene
t-BHP=t-Butyl hydroperoxide (70%)
TREM™ LF-40=Sodium dodecyl allyl sulfosuccinate (40%)

EXAMPLE 1

Preparation of Sulfur Acid-functional First Polymer

A 1 liter glass reactor was charged with 150.2 g ethanol. Under a nitrogen blanket the reactor was heated to 75° C. When the reactor reached 75° C., a monomer feed consisting of 108.0 g ethanol, 1.56 g VAZO™-52, 2.30 g n-DDM, 23.00 g BA, 51.74 g MMA and 40.25 g SEM was fed into the reactor over a period of 66 minutes. A temperature of 75±2° C. was maintained throughout the whole process. At the end of the monomer feed a solution of 1.15 g VAZO™-52 dissolved in 21.85 g ethanol was fed into the reactor over a period of 30 minutes. At the end of this feed the temperature was maintained at 75±2° C. for another 60 minutes before cooling. Final solids of the product was 28.7%.

EXAMPLE 2

Preparation of Sulfur Acid-functional First Polymer

A 1 liter glass reactor was charged with 178.92 g ethanol. Under a nitrogen blanket the reactor was heated to 75° C. When the reactor reached 75° C., a feed consisting of 50.59 g MMA, 21.85 g BA and 2.30 g n-DDM and a feed consisting of 1.56 g VAZO™-52, 79.23 g ethanol, 17.00 g water and 42.55 g AMPS were fed simultaneously into the reactor over a period of 1 hour. A temperature of 75±2° C. was maintained throughout the whole process. At the end of the monomer feed a solution of 1.15 g VAZO™-52 dissolved in 21.85 g ethanol was fed into the reactor over a period of 30 minutes. At the end of this feed the temperature was maintained at 75±2° C. for another 60 minutes before cooling. Final solids of the product was 28.3%.

EXAMPLE 3

Preparation of Sulfur Acid-functional First Polymer

A 1 liter glass reactor was charged with 107.12 g ethanol. Under a nitrogen blanket the reactor was heated to 75° C. When the reactor reached 75° C., a feed consisting of 11.28 g MSi, 126.93 g MMA, 56.41 g BA and 98.72 g SEM and a feed consisting of a solution of 3.84 g VAZO™-52 in 72.88 g ethanol were fed simultaneously into the reactor over a period of 4 hours. A temperature of 75±2° C. was maintained throughout the whole process. At the end of the feeds the temperature was maintained at 75±2° C. for another 30 minutes before cooling. The batch was cut with 191.60 g ethanol. Final solids of the product was 41.4%.

COMPARATIVE EXAMPLE A

Preparation of Sulfur-acid Functional Polymer

A 1 liter glass reactor was charged with 158.59 g ethanol. Under a nitrogen blanket the reactor was heated to 75° C. When the reactor reached 75° C., a monomer feed consisting of 58.83 g ethanol, 2.05 g VAZO™-52, 6.02 g n-DDM, 100.79 g MMA, 9.03 g SEM and 40.62 g AA was fed into the reactor over a period of 2 hours and 52 minutes. A temperature of 75±2° C. was maintained throughout the whole process. At the end of the monomer feed a solution of 1.50 g VAZO™-52 dissolved in 22.58 g ethanol was fed into the reactor over a period of 28 minutes. At the end of this feed the temperature was maintained at 75±2° C. for another 40 minutes before cooling. Final solids of the product was 40.4%.

EXAMPLE 4

Formation of Opacifying Pigment Dispersion

A mixture was prepared of 20.2 g of Example 2, 100.0 g ethanol and 1.0 g 28% ammonia. After stirring for 10 minutes, this solution was transferred to a steel grind pot. Agitation was set at 100 rpm and slowly 400.0 g TiO2 (TIPURE™ R-706) was added. During the addition the agitation was gradually increased to 1500 rpm. At the end of the addition the agitation was kept at 1500 rpm for 90 minutes. At the end of the dispersion process the slurry was dried in vacuo at 50° C. until substantially dry. The recovered solids was placed in a glass dish and dried at 80° C. in a vacuum oven for 18 hours. 100 g water was charged to a steel grind pot. At 1500 rpm, the dried powder was charged to this grind pot. The agitation was kept at 1500 rpm for 2 hours. The slurry was filtered over a 300 mesh screen. The final product had a solids content of 75.4%. The Zeta Potential of the dispersion was −39 mV at pH 5, −41 mV at pH 6 and −42 mV at pH 7.

EXAMPLE 5

Formation of Opacifying Pigment Dispersion

A mixture was prepared of 20.9 g of Example 1, 100.0 g ethanol and 1.0 g 28% ammonia. After stirring for 10 minutes, this solution was transferred to a steel grind pot. Agitation was set at 100 rpm and slowly 400.0 g TiO2 (TIPURE™ R-706) was added. During the addition the agitation was gradually increased to 1500 rpm. At the end of the addition the agitation was kept at 1500 rpm for 90 minutes. At the end of the dispersion process the slurry was dried in vacuo at 50° C. until substantially dry. The recovered solids was placed in a glass dish and dried at 80° C. in a vacuum oven for 18 hours. 100 g water was charged to a steel grind pot. At 1500 rpm, the dried powder was charged to this grind pot. The agitation was kept at 1500 rpm for 2 hours. The slurry was filtered over a 300 mesh screen. The final product had a solids content of 74.8%. The Zeta Potential of the dispersion was −43 mV at pH 5, −49 mV at pH 6 and −50 mV at pH 7.

EXAMPLE 6

Formation of Opacifying Pigment Dispersion

A mixture was prepared of 14.5 g of Example 3, 100.0 g ethanol and 1.0 g 28% ammonia. After stirring for 10 minutes, this solution was transferred to a steel grind pot. Agitation was set at 100 rpm and slowly 400.0 g TiO2 (TIPURE™ R-706) was added. During the addition the agitation was gradually increased to 1500 rpm. At the end of the addition the agitation was kept at 1500 rpm for 90 minutes. At the end of the dispersion process the slurry was dried in vacuo at 50° C. until substantially dry. The recovered solids was placed in a glass dish and dried at 120° C. in a vacuum oven for 4 hours. 100 g water was charged to a steel grind pot. At 1500 rpm, the dried powder was charged to this grind pot. The agitation was kept at 1500 rpm for 2 hours then 12.0 g Triton X-405 was added to the slurry. Agitation was maintained for another 5 minutes. The slurry was filtered over a 300 mesh screen. The final product had a solids content of 74.6%. The Zeta Potential of the dispersion was −43 mV at pH 5, −49 mV at pH 6 and −49 mV at pH 7.

COMPARATIVE EXAMPLE B

Formation of Opacifying Pigment Dispersion

The sulfur acid functional polymer prepared under Comparative example A was dried until constant weight by using a rota-evaporator. An aqueous solution was prepared by dissolving 10.17 g of the dried polymer in 90.17 g water and 20.86 g ammonia (2.8%). The solution had a solids contents of 7.5%. A stainless steel grind pot was charged with 100.0 g of the solution and 67.67 g water. At 1000 rpm's 500 g TIPURE™ R-706 was added in about 2 minutes. The agitation was maintained at 1000 rpm's for 1 hour. The slurry was filtered through a 325 mesh filtration bag. The solids was measured to be 75.5%. The Zeta Potential of the dispersion was −22 mV at pH 5, −37 mV at pH 6 and −43 mV at pH 7.1

EXAMPLE 7

Formation of Polymer-Encapsulated Pigment Particles

A 1000 ml, four necked round bottom flask was equipped with paddle stirrer, thermometer, nitrogen inlet, and reflux condenser. 57.0 g DI water and 7.2 g Triton™ X-405 was added to the flask. While the flask contents were stirring, 332.0 g of Example 4 was added to the flask. 10 g of DI water was added as a rinse to the flask. The flask was then heated to 50° C. under a nitrogen atmosphere. A monomer emulsion (ME) was prepared by mixing 32.6 g DI water, 5.5 g Rhodacal$^R$ DS-4, 72.0 g BMA, 50.0 g MMA, and 2.5 g MAA. With the flask contents at 50° C., a feed consisting of a solution of 1.0 g SSF in 29.0 g DI water and a feed consisting of a mixture of 1.77 g t-BHP (70% aq.) and 27.6 g Di water were started simultaneously. Both feeds were set to run for 4 hours and 5 minutes. 5 minutes after the start of these two feeds, 5.04 g of a 0.1% strength ferrous sulfate heptahydrate solution was added to the flask and the ME feed was started. The ME feed was fed into the flask over a period of 3.5 hours while maintaining the temperature in the flask at 50±2° C. At the end of the feeds the flask was kept at 50±2° C. for another 30 minutes before cooling to room temperature. The pH of the dispersion was adjusted to 8.5-9.0 by the addition of ammonia (28%). The product was filtered over a 325 mesh screen. The final product has a solids content of 59.4% and 86% of the polymer was attached to the pigment particles.

EXAMPLE 8

Formation of Polymer-Encapsulated Pigment Particles

A 1000 ml, four necked round bottom flask was equipped with paddle stirrer, thermometer, nitrogen inlet, and reflux condenser. 41.81 g DI water and 4.17 g Triton™ X-405 was added to the flask. While the flask contents were stirring, 309.0 g of Example 5 was added to the flask. 10 g of DI water was added as a rinse to the flask. The flask was then heated to 50° C. under a nitrogen atmosphere. A monomer emulsion (ME) was prepared by mixing 40.0 g DI water, 6.29 g Rhodacal$^R$ DS-4, 50.66 g BMA, 91.19 g Sty, and 2.89 g MAA. With the flask contents at 50° C., a feed consisting of a solution of 1.16 g SSF in 40.0 g DI water and a feed consisting of a mixture of 2.08 g t-BHP (70% aq.) and 39.2 g DI water were started simultaneously. Both feeds were set to run for 4 hours and 5 minutes. 5 minutes after the start of these two feeds, 6.0 g of a 0.1% strength ferrous sulfate heptahydrate solution was added to the flask and the ME feed was started. The ME feed was fed into the flask over a period of 3.5 hours while maintaining the temperature in the flask at 50±2° C. At the end of the feeds the flask was kept at 50±2° C. for another 20 minutes before cooling to room temperature. The pH of the dispersion was adjusted to 8.5-9.0 by the addition of ammonia (28%). The product was filtered over a 325 mesh screen. The final product has a solids content of 59.3% and 82% of the polymer was attached to the pigment particles.

EXAMPLE 9

Formation of Polymer-Encapsulated Pigment Particles

A 1000 ml, four necked round bottom flask was equipped with paddle stirrer, thermometer, nitrogen inlet, and reflux condenser. 52.5.0 g DI water and 3.3 g Triton™ X-405 was added to the flask. While the flask contents were stirring, 309.0 g of Example 6 was added to the flask. 10 g of DI water was added as a rinse to the flask. The flask was then heated to 50° C. under a nitrogen atmosphere. A monomer emulsion (ME) was prepared by mixing 30.2 g DI water, 5.1 g Rhodacal$^R$ DS-4, 40.3 g BMA, 72.5 g Sty, and 2.3 g MAA. With the flask contents at 50° C., a feed consisting of a solution of 0.92 g SSF in 27.5 g DI water and a feed consisting of a mixture of 1.64 g t-BHP (70% aq.) and 25.7 g DI water were started simultaneously. Both feeds were set to run for 4 hours and 5 minutes. 5 minutes after the start of these two feeds, 5.0 g of a 0.1% strength ferrous sulfate heptahydrate solution was added to the flask and the ME feed was started. The ME feed was fed into the flask over a period of 3.5 hours while maintaining the temperature in the flask at 50±2° C. At the end of the feeds the flask was kept at 50±2° C. for another 30 minutes before cooling to room temperature. The pH of the dispersion was adjusted to 8.5-9.0 by the addition of ammonia (28%). The product was filtered over a 325 mesh screen. The final product has a solids content of 59.5% and 87% of the polymer was attached to the pigment particles.

COMP. EXAMPLE C

Formation of Polymer-Encapsulated Pigment Particles

A 1 liter reactor was charged with 233.0 g DI water and 6.3 g TRITON™ X-405 (35% solids). Under agitation 290.0 g of the TiO2 slurry Comp. Example D was slowly added to the reactor. Under a nitrogen atmosphere the reactor was heated to 50° C. When the reactor reached 50° C. a feed of 0.87 g SSF dissolved in 26.1 g DI water was started simultaneous with a feed of 1.58 g tBHP (70% active) dissolved in 24.5 g DI water. Both feeds were set to run for 4 hours and 5 minutes. After 5 minutes into the feed, a mixture of 4.5 g FeSO4 (0.1% solids) and 11.0 g VERSENE™ (1% solids) were added to the reactor and a pre-emulsified monomer feed was started consisting of 28.8 g DI water, 4.8 g RHODACAL™ DS-4 (23%), 43.7 g MMA, 63.5 g BMA and 2.2 g MAA. The pre-emulsified monomer feed was set to run for 3.5 hours. After about 1 hour and 12 minutes into the monomer feed, massive amounts of sediment formed rendering agitation impossible. The batch was abandoned.

EXAMPLES 10-14 AND COMP. EXAMPLES D-G

Formation of TiO2 Opacifying Pigment Dispersions and Determination of Zeta Potential Pigment dispersions were prepared according to the methods of Examples 4-6 using TIPURE™ R-706 and zeta potentials were measured.

| Dispersion EXAMPLE | First polymer comp. | Zeta potential pH = 5 | Wt. % disp/TiO2 | Wt. % solids |
|---|---|---|---|---|
| Comp. D | MMA85/SEM15/nDDM4 | −28 | 1.5 | 67.7 |
| Comp. E | MMA85/SEM15/nDDM4 | −28 | 1.5 | 73.4 |
| Comp. F | MMA67/SEM6/AA27/nDDM4 | −22 | 1.5 | 75.5 |
| Comp. G | BA30/MMA55/MAA15/MSi2 | −5 | 1.5 | 74.1 |
| 110 | BA20/MMA45/SEM35/nDDM2 | −43 | 1.5 | 74.8 |
| 11 | BA19/MMA43/AMPS37/nDDM2 | −39 | 1.5 | 75.4 |
| 12 | BA24/MMA55/SEM21/nDDM2 | −35 | 1.5 | 75.2 |

| Dispersion EXAMPLE | First polymer comp. | Zeta potential pH = 5 | Wt. % disp/TiO2 | Wt. % solids |
|---|---|---|---|---|
| 13 | BA20/MMA45/SEM17/HEMA18/nDDM2 | −29 | 1.5 | 76.1 |
| 14 | BA20/MMA45/SEM35/nDDM2.1 | −43 | 1.5 | 73.6 |

EXAMPLES 15-25 AND COMP. EXAMPLES H-L

Formation of Opacifying Pigment Encapsulated in Polymer

| EXAMPLE No. | Dispersion of Ex. No. | Target solids of encap. pigment | Second polymer comp. (wt. %) | Wt. mon./wt. TiO2 | % attach | Process result |
|---|---|---|---|---|---|---|
| Comp. H | Comp. D | 41.9 | BMA58/MMA40/MAA2 | 50 | 62.4 | |
| Comp. I | Comp. E | 45 | BMA58/MMA40/MAA2 | 50 | — | crashed 70% into the feed |
| Comp. J | Comp. F | 45 | BMA58/MMA40/MAA2 | 50 | — | crashed 34% into the feed |
| Comp. K | Comp. G | 45.4 | 50MMA/50BA | 100 | — | crashed 60% into the feed |
| Comp. L | Comp. G | 45 | STY65/BMA35 | 50 | — | crashed at end of the feed |
| 15 | 12 | 60 | BMA35/STY63/MAA2 | 50 | 81.5 | |
| 16 | 12 | 60 | BMA58/MMA40/MAA2 | 50 | 68.5 | |
| Comp. M | 12 | 60 | BMA35/STY63/MAA2 | 50 | — | Fast feed; crashed 45% into the feed |
| 17 | 13 | 60 | BMA58/MMA40/MAA2 | 50 | 84.5 | |
| 18 | 14 | 60 | BMA58/MMA40/MAA2 | 50 | 81.1 | |
| 19 | 14 | 60 | BMA35/STY63/MAA2 | 50 | 90.7 | |
| 20 | 15 | 60 | BMA58/MMA40/MAA2 | 50 | 74.7 | |
| 21 | 15 | 60 | BMA35/STY63/MAA2 | 50 | 92.4 | |
| 22 | 16 | 60 | BMA35/STY63/MAA2 | 50 | 85 | |
| 23 | 16 | 60 | BMA58/MMA40/MAA2 | 50 | 88.2 | |
| 24 | 16 | 60 | BMA35/S63/MAA2 | 50 | 82.1 | |
| 25 | 16 | 60 | BA5/STY93/MAA2 | 50 | 71.3 | |

Examples 15-25 of the present invention provide acceptable process and encapsulated pigment compositions at a viable process solids of 50 wt % or greater with an acceptable degree of attachment of the second polymer to the pigment. Comp. Examples H-L provided processes that were run at unacceptably low process solids and Comp. Examples I-L provided unacceptable results even at those low solids. Comp. Example M was a fast feed process resulting in unacceptably high free in-process monomer that provided unacceptable results.

We claim:

1. A process for forming an opacifying pigment encapsulated in polymer comprising: (a) dispersing a pigment particle having an average particle diameter of from 150 to 500 nm and an index of refraction of at least 1.8 in a medium with from 0.1% to 10% by weight, based on the weight of said pigment particle, a first polymer, wherein the zeta potential of said dispersed pigment particle is less than −28 mV between pH 5 and pH 8; and (b) performing an emulsion polymerization in the presence of said dispersed pigment particle to provide from 10% to 200%, by weight, based on the weight of the pigment particle, of a second polymer that at least partially encapsulates said dispersed pigment particle, wherein the first polymer consists essentially of at least three sulfur acid moieties or a salt thereof and at least one other moiety selected from the group consisting of an amine functional monomer; styrene; vinyl toluene; vinyl acetate; vinyl versatate; acrylonitrile; (meth)acrylamide; $C_1$-$C_{40}$ esters of (meth)acrylic acid; alcohol containing monomers; and ethylenically unsaturated mono-, di- and trialkyl esters of ethylenically unsaturated carboxylic acids and anhydrides and wherein the molecular weight of the first polymer is controlled by a chain transfer reagent consisting of an alkyl mercaptan or an alcohol or a halogenated compound.

2. The process of claim 1 wherein said pigment particle comprises $TiO_2$.

3. The process of claim 2 wherein said second polymer comprises, as a copolymerized unit, at least one water-soluble monomer.

4. The process of claim 3 wherein said water-soluble monomer is acid-functional.

5. The process of claim 1 wherein said second polymer comprises at least two phases, wherein one polymer phase has a Tg greater than or equal to 30° C. and one polymer phase has a Tg less than or equal to 12° C.

6. The process of claim 1 wherein said second polymer comprises at least two phases, wherein a first polymer phase comprises, as copolymerized units, at least one multifunctional monomer.

* * * * *